United States Patent
Morimura

(10) Patent No.: US 6,904,333 B2
(45) Date of Patent: Jun. 7, 2005

(54) MOLDING MACHINE MANAGING SYSTEM, MOLDING MACHINE MANAGING APPARATUS, PORTABLE INFORMATION TERMINAL, RECORDING MEDIUM WHERE PROGRAM FOR MOLDING MACHINE MANAGING APPARATUS IS INSTALLED, AND RECORDING MEDIUM WHERE PROGRAM FOR PORTABLE INFORMATION TERMINAL IS INSTALLED

(75) Inventor: Tatsuo Morimura, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/644,509

(22) Filed: Aug. 21, 2003

(65) Prior Publication Data

US 2004/0044434 A1 Mar. 4, 2004

(30) Foreign Application Priority Data

Aug. 27, 2002 (JP) ........................................ 2002-247511

(51) Int. Cl.⁷ .......................... G06F 11/00; G06F 15/00; B29C 39/00; G08B 1/08; H04Q 7/00
(52) U.S. Cl. ................... 700/197; 702/188; 340/539.11
(58) Field of Search ................................. 700/197, 204; 702/188; 340/539.11

(56) References Cited

U.S. PATENT DOCUMENTS

| 6,145,022 A | * | 11/2000 | Takizawa et al. | .............. 710/10 |
| 6,665,581 B2 | * | 12/2003 | Nishida et al. | .............. 700/204 |
| 2002/0031567 A1 | * | 3/2002 | Magario | ...................... 425/135 |

FOREIGN PATENT DOCUMENTS

| DE | 202 04 359 U1 | 7/2002 |
| EP | 0 377 736 A1 | 7/1990 |
| EP | 1 128 244 A2 | 8/2001 |
| JP | 5-192975 | 8/1993 |
| JP | 6-39889 | 2/1994 |
| JP | 7-171870 | 7/1995 |
| JP | 7-241896 | 9/1995 |
| JP | 2002-86531 | 3/2002 |
| JP | 2002-370271 | 12/2002 |
| JP | 2003-1686 | 1/2003 |

* cited by examiner

*Primary Examiner*—Leo Picard
*Assistant Examiner*—Ryan Jarrett
(74) *Attorney, Agent, or Firm*—Squire, Sanders & Dempsey L.L.P.

(57) ABSTRACT

A molding machine managing system includes a portable information terminal having a display part where received information is displayed, and a managing apparatus for managing a molding machine. The managing apparatus includes a radio machine. Information is exchanged between the portable information terminal and the managing apparatus by the radio machine.

27 Claims, 9 Drawing Sheets

1ST MACHINE

| ITEMS | BEFORE CHANGED | AFTER CHANGED | DATE AND TIME |
|---|---|---|---|
| METERING FINISHING POSITION | 46.25 | 46.20 | 2003/06/05 14:15:20 |
| CYCLE MONITOR MODE | 0 | 1 | 2003/06/05 10:20:15 |
| MOLD PROTECTION MONITOR MODE | 0 | 1 | 2003/06/05 10:20:15 |
| MAXIMUM CUSHION MONITOR MODE | 0 | 1 | 2003/06/05 10:20:15 |
| MINIMUM CUSHION MONITOR MODE | 0 | 1 | 2003/06/05 10:20:15 |

| 1ST MACHINE | | | |
|---|---|---|---|
| | ITEMS | TIME OF OCCURRENCE OF ABNORMALITY | TIME OF LIFTING OF ABNORMALITY |
| | [ABNORMALITY] MOLD PROTECTION | 2003/06/01 10:20:15 | 2003/06/02 14:15:10 |
| | [INTER ROCK] SAFETY DOOR OPEN | 2003/06/01 10:20:15 | 2003/06/02 14:15:10 |
| | [INTER ROCK] NOT FINISHED MOLD CLAMPING ADJUSTMENT | 2003/06/01 10:20:15 | 2003/06/02 14:15:10 |

| 1ST MACHINE | |
|---|---|
| MOLDING CONDITION | INITIAL |
| STATUS — ABNORMALITY OCCURS — TIME OF STOPPING | 000:01:15 |
| OCCURRENCE TIME | 03/05 11:06:09 |
| RESTART TIME | 03/05 11:07:24 |
| ABNORMALITY | [A000]CYCLE |
| SUPPLEMENT | MOLD PROTECTION ABNORMALITY |
| PERIPHERAL APPARATUS | MOLD |
| REASON | PIN IS BROKEN |
| OPERATOR | × × × × |
| MEMO | REPAIRABLE |

| | MANUFACTURING INSTRUCTION |
|---|---|
| OPERATOR | × × × × |
| 1ST MACHINE | MOLDING MACHINE |
| ▲  ▼ | EDIT  RETURN |
| PRODUCT | FLOWERPOT |
| MOLDING CONDITION | FLOWERPOT AB |
| MOLD | FLOWERPOT 001 |
| MATERIAL | PP |
| ESTIMATED MANUFACTURED NUMBER | 1000 |

OPERATOR × × × ×

81 — 1ST MACHINE ▼

82 — SELECT   MENU

[REGISTER]  OPERATOR × × × ×

| 1ST MACHINE | |
|---|---|
| MOLDING CONDITION | INITIAL |
| STATUS — ABNORMALITY OCCURS | TIME OF STOPPING — 000:01:15 |
| OCCURRENCE TIME | 03/05  11:06:09 |
| RESTART TIME | 03/05  11:07:24 |
| ABNORMALITY | [A000]CYCLE |
| SUPPLEMENT | MOLD PROTECTION ABNORMALITY ▼ |
| PERIPHERAL APPARATUS | MOLD ▼ |
| REASON | PIN IS BROKEN ▼ |
| MEMO | REPAIRABLE |

MOLDING MACHINE MANAGING SYSTEM, MOLDING MACHINE MANAGING APPARATUS, PORTABLE INFORMATION TERMINAL, RECORDING MEDIUM WHERE PROGRAM FOR MOLDING MACHINE MANAGING APPARATUS IS INSTALLED, AND RECORDING MEDIUM WHERE PROGRAM FOR PORTABLE INFORMATION TERMINAL IS INSTALLED

BACKGROUND OF THE INVENTION

1. Field of the Invention

The present invention generally relates to molding machine managing systems, molding machine managing apparatuses, portable information terminals for said systems, recording media where programs for said molding machine managing apparatuses are installed, and recording media where programs for said portable information terminals are installed.

2. Description of the Related Art

Generally, at a manufacturing factory for plastic articles where at least a single injection molding machine is located, information such as a schedule, operations instructions, an operation process or the like is transferred from a managing room to an operator on a manufacturing floor and information regarding molding such as quality information, operations information, or the like is transmitted from the operator at the manufacturing floor to the managing room. The above mentioned information is generally transferred by a paper document.

Furthermore, as for means other than the paper document, managing system means for transferring information by connecting at least a single injection molding machine and a managing apparatus located at a managing room with a network is provided. More specifically, information about the operations instructions or the like is transferred from the managing apparatus to the injection molding machine and information regarding molding is transferred from the operator on the manufacturing floor to the managing apparatus, by using a control apparatus provided at a control part of the injection molding machine and a display.

However, in a case where the above mentioned information is transmitted by using the paper document, it may take several hours to transfer the information to the manufacturing floor where the information is required from the managing room. Therefore, transferring information by the paper may cause delay in transferring of the information.

Furthermore, even if the above mentioned managing system is applied, manufacturing places of the operator are various and may be not only in the vicinity of the injection molding machine but also an inspection room, a maintenance room, a place where raw materials are put, a product warehouse, or the like. Therefore, the operator is not always in the vicinity of the injection molding machine.

Because of this, even if information regarding operations instructions is sent from the managing apparatus to the control apparatus of the injection molding machine and displayed at the display, the operator does not always obtain and check the information in real-time.

In addition, in the above mentioned managing system, in order to transfer the information to the managing apparatus, the operator has to go the location of the injection molding machine or the control apparatus of the injection molding machine. That may cause a reduction in operations efficiency.

SUMMARY OF THE INVENTION

Accordingly, it is a general object of the present invention to provide a novel and useful molding machine managing system, molding machine managing apparatus, portable information terminals for said system, recording medium where a program for said molding machine managing apparatus is installed, and recording medium where a program for said portable information terminal is installed, in which one or more of the problems described above are eliminated.

Another and more specific object of the present invention is to provide a molding machine managing system, including a portable information terminal having a display part where received information is displayed; and a managing apparatus for managing a molding machine, wherein the managing apparatus includes a radio machine, and information is exchanged between the portable information terminal and the managing apparatus by the radio machine.

The above objects of the present invention are achieved by a molding machine managing apparatus for managing a molding machine, including a radio machine, wherein the molding machine managing apparatus exchanges information with a portable information terminal by the radio machine.

The above objects of the present invention are achieved by a potable information terminal, including a display part where received information is displayed, wherein the potable information terminal exchanges transferring information with a molding machine managing apparatus for managing a molding machine.

The above objects of the present invention are achieved by a recording medium where a program is installed, the program for causing a molding machine managing apparatus for managing a molding machine to perform steps, the managing apparatus having a radio machine, the steps including:

a) receiving information about a history of an operation abnormality of the molding machine from the molding machine; and b) transferring the information to a portable information terminal.

The above objects of the present invention are achieved by a recording medium where a program is installed, the program for causing a portable information terminal having a display part where received information is displayed to perform steps, the portable information terminal being used for exchanging information with a managing apparatus for managing the molding machine, the steps including:

a) receiving information about a history of an operation abnormality of the molding machine from the molding machine; and b) displaying the information at the display part.

According to the above mentioned inventions, even if an operator is far from the molding machine or the molding machine managing apparatus, information can be transferred in real time and used jointly, so that improvements in manufacturing quality and an operation ratio of equipment in the manufacturing factory and efficiency of operations can be achieved.

Other objects, features, and advantages of the present invention will become more apparent from the following detailed description when read in conjunction with the accompanying drawings.

BRIEF DESCRIPTION OF THE DRAWINGS

FIG. 4 is a view showing a setting history picture 24 which is a third example of the managing picture displayed at the display apparatus of the managing apparatus 20;

FIG. 5 is a view showing an abnormality history picture 25 which is a fourth example of the managing picture displayed at the display apparatus of the managing apparatus 20;

FIG. 8 is a view showing a picture (stop table picture) 60 of a PDA 30 where an abnormality occurrence history is displayed;

FIG. 9 is a view showing a picture (operation instruction information picture) 70 of the PDA 30 where operations instruction information is displayed;

FIG. 10 is a view showing a machine selection picture 80 of the PDA 30; and

FIG. 11 is a view showing a stop reason editing picture 85 of the PDA 30.

DETAILED DESCRIPTION OF THE PREFERRED EMBODIMENT

A description will now be given, with reference to FIGS. 1 through 11, of embodiments of the present invention.

Figure 1:
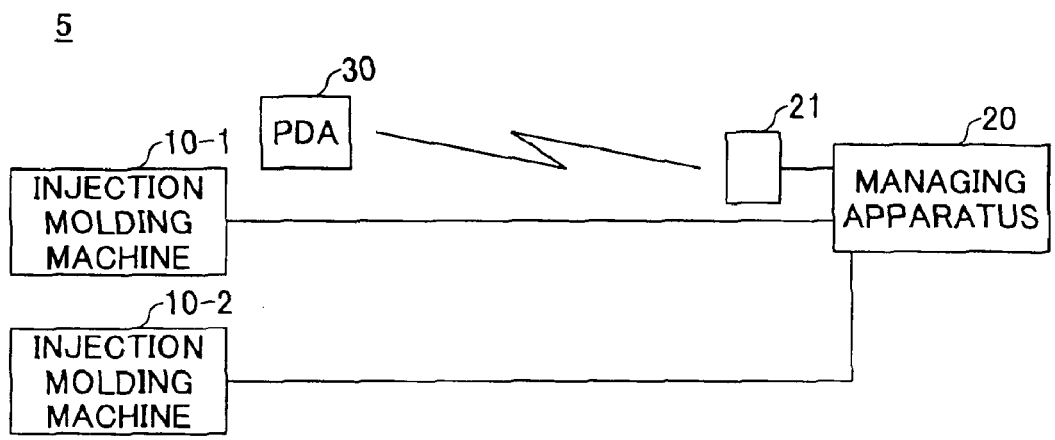
FIG. 1 is a structural view of a molding machine managing system of an embodiment of the present invention.

FIG. 1 is a structural view of a molding machine managing system 5 of an embodiment of the present invention. Referring to FIG. 1, a molding machine managing system 5 of an embodiment of the present invention includes two injection molding machines 10-1 and 10-2 functioning as operations apparatuses, a managing apparatus 20, a PDA (Portable Digital Assistant) 30, and the like.

For convenience of explanation, a case where two injection molding machines 10-1 and 10-2 are managed by the single managing apparatus 20 and the single PDA 30 is shown in FIG. 1. However, the present invention may be applied to a case where a single or three or more injection molding machines are managed by the single managing apparatus 20 and the single PDA 30.

In the molding machine managing system 5 of this embodiment, the managing apparatus 20 is positioned far from a manufacturing floor of a manufacturing factory. Respective control apparatuses (not shown in FIG. 1) of the injection molding machines 10-1 and 10-2 provided on the manufacturing floor are connected to the managing apparatus 20 via an LAN (Local Area Network) using a protocol such as Ethernet (Registered Trademark). Furthermore, a display apparatus (not shown in FIG. 1) is provided at the managing apparatus 20.

In the above mentioned structure, information about the injection molding machines 10-1 and 10-2 is collectively managed by the managing apparatus 20.

Furthermore, the radio machine 21 is connected to the managing apparatus 20 so that information is transferred between the PDA 30 and the managing apparatus 20 by a radio LAN. That is, the managing apparatus 20 functions as an information managing server in terms of a relationship with the PDA 30. Therefore, a manager of the managing apparatus 20 can exchange information with an operator using the PDA 30 via the radio machine 21, so that operations efficiency can be improved.

Next, details of the managing apparatus 20 are described.

The managing apparatus 20 receives various information items from various sensors provided at respective injection molding machines 10-1 and 10-2, via the PDA 30 or respective control apparatuses of the injection molding machines 10-1 and 10-2.

An exclusive managing program (managing software) is installed in the managing apparatus 20. By the managing program, received information such as quality information or various history information described below is processed for every injection molding machine. A result of the process is stored in a memory installed in the managing apparatus 20 and displayed on the display apparatus of the managing apparatus 20 as a managing picture. Depending on the kind of information, received information is stored in the memory without any process.

Next, the managing picture displayed on the display apparatus of the above mentioned managing apparatus 20 is described. The managing picture shows an operations status of the respective injection molding machines 10-1 and 10-2. There are plural kinds of the managing pictures. Examples of the managing pictures are described below.

Figure 2:
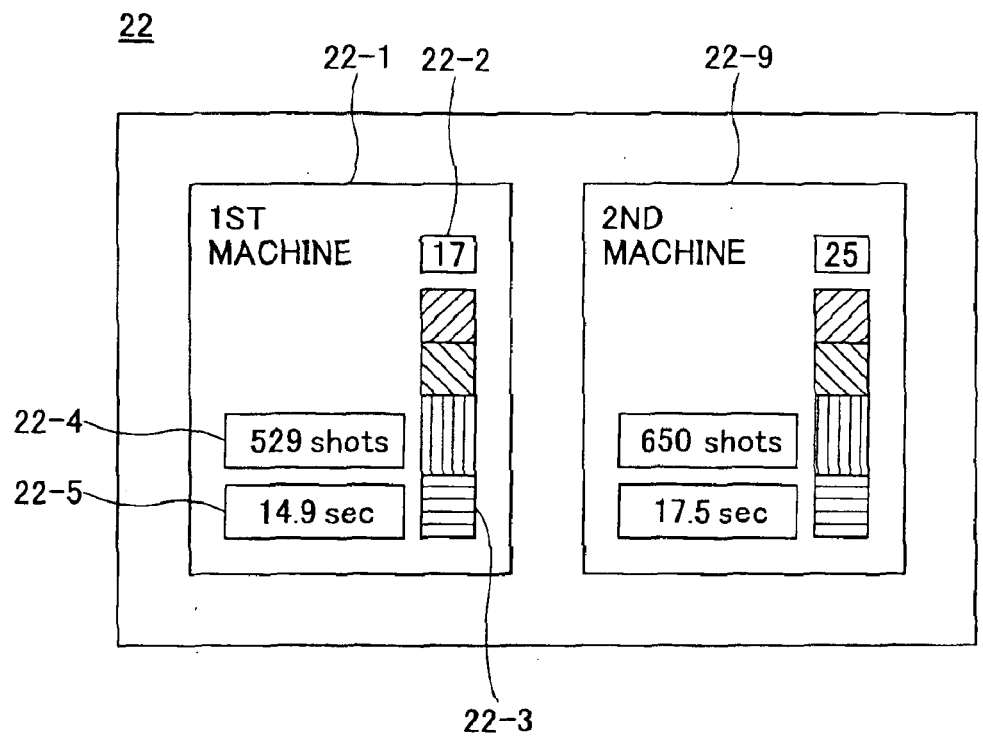
FIG. 2 is a first example of a managing picture displayed at a display apparatus of a managing apparatus 20.

FIG. 2 is a first example of the managing picture displayed at the display apparatus of the managing apparatus 20. The picture shown in FIG. 2 is an operations status picture 22 in which operations statuses of the injection molding machines 10-1 and 10-2 are displayed in real time. The operations statuses of the injection molding machines 10-1 and 10-2 are divided into a first machine picture 22-1 displaying an operations status of a first machine (the injection molding machine 10-1) and second machine picture 22-9 displaying an operations status of a second machine (the injection molding machine 10-2), so as to be collectively displayed as a single operations status picture 22 in real time.

The number of the machine is displayed at the upper left corner of the first machine picture 22-1 displaying the operations status of a first machine (the injection molding machine 10-1) of the operations status picture 22. Furthermore, a molding condition change counter display part 22-2 for displaying a counted value by a molding condition change counter is provided at the right-upper side of the picture.

Here, the molding condition change counter is a counter for counting how many times the molding conditions are changed from start of molding to the present. This counter is provided at the managing apparatus 20. Means for detecting changes of the molding conditions are provided at the respective control apparatuses of the injection molding machines 10-1 and 10-2.

The molding condition change counter provided at the managing apparatus 20 counts how many times the molding conditions are changed from start of molding to the present, based on detection results of respective control apparatuses, so as to display the counted results at the display apparatuses of every machines. In a case shown in FIG. 2, the molding conditions have changed seventeen times for the first machine.

A shot number display part 22-4 for displaying a shot number and a cycle time display part 22-5 for displaying a cycle time are provided at the lower side of the first machine picture 22-1. In this embodiment, "529" [shots] is displayed as a shot number of the first machine and "14.9" [seconds] is displayed as a cycle number of the first machine, in this embodiment.

A 24-hour operations status graph 22-3 is provided at the right side of the first machine picture 22-1.

Here, the 24-hour operations status graph 22-3 displays operations conditions of the injection molding machine for the past 24 hours with color codes as a single stick type graph. The operations status is classified by four types, "operation", "normal stop(standby)", "stop due to occurrence of abnormality", and "electric power shut off". The operation conditions are displayed with color codes as corresponding to a time progression of the past 24 hours. For example, "operation" is displayed with a blue color (a right rising hatching in FIG. 2), "normal stop(standby)" is displayed with a yellow color (a left rising hatching in FIG. 2), "stop due to occurrence of abnormality" is displayed with a red color (a vertical hatching in FIG. 2), and "electric power shut off" is displayed with a gray color (a horizontal hatching). The lowest end of the 24-hour operations status graph 22-3 mentions "situation of 24 hours prior" and the highest end of the 24-hours operations status graph 22-3 mentions "present situation".

The manager or the like can know the operation status of each of the injection molding machines for the past 24 hours by checking the operations status picture. The numerical value of "24 hours" is normally fixed but may be changeable.

Figure 3:
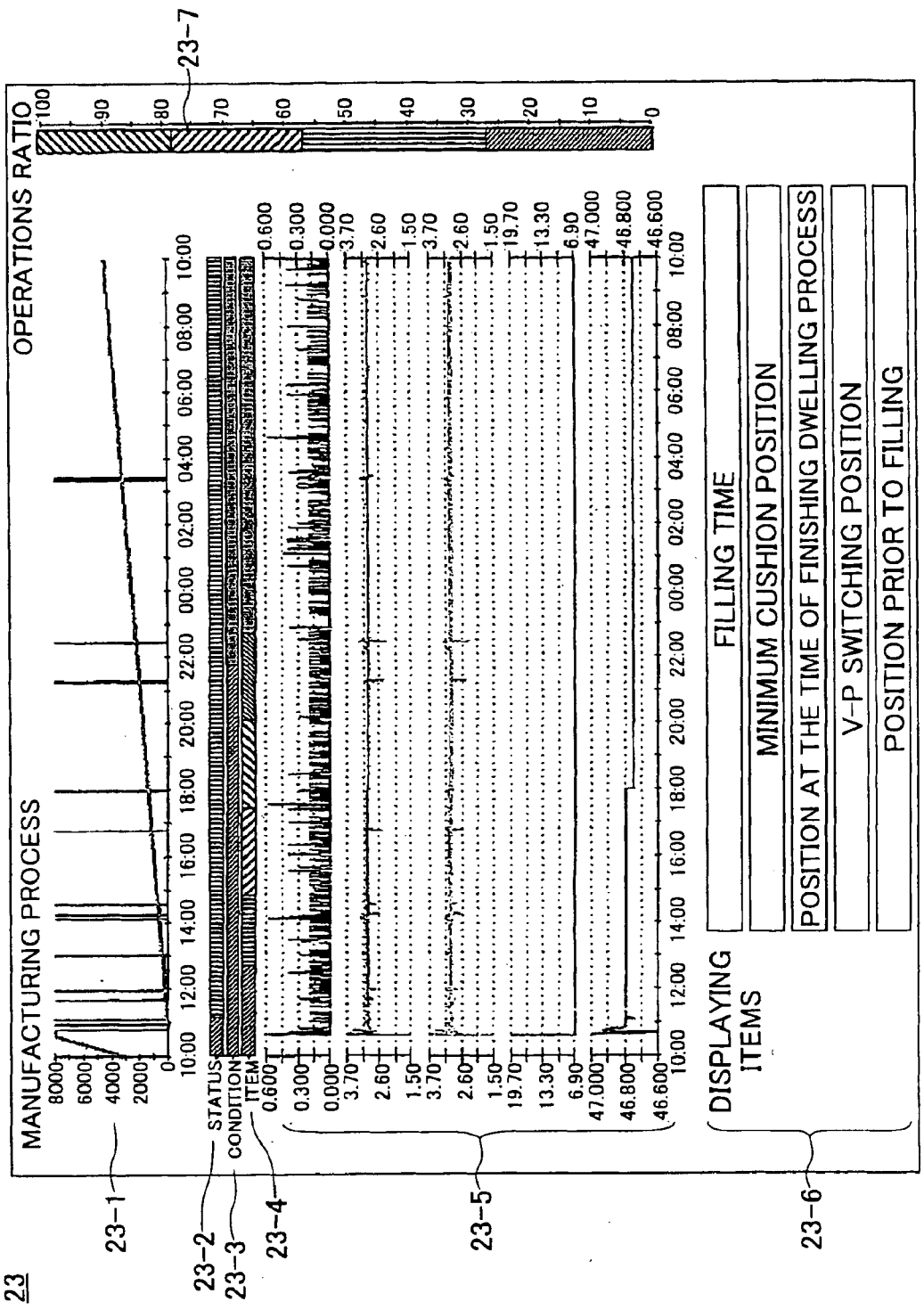
FIG. 3 is a view showing a summary graph picture 23 which is a second example of the managing picture displayed at the display apparatus of the managing apparatus 20.

FIG. 3 is a view showing the summary graph picture 23, which is a second example of the managing picture displayed at the display apparatus of the managing apparatus 20. The summary graph picture 23 shows a past operations status of the first machine. The summary graph picture 23 links with the first machine picture 22-1. Hence, by clicking a designated position at the first machine picture 22-1, the summary graph picture 23 is displayed so that details of the past operations status of the first machine are shown.

Although the first machine is explained as an example in this embodiment, it is also possible to display a summary graph picture showing details of a past operations status of the second machine by clicking a designated position at the second machine picture 22-9.

Referring to FIG. 3, in the summary graph picture 23, status of quality data change for 24 hours, whether abnormality occurrence exists, and whether setting change exists are shown at a single picture wherein time is represented as the horizontal axis.

A line graph 23-1 is provided at the most upper part of the summary graph picture 23. The line graph 23-1 represents a change of accumulation values of a shot number against time passing.

The same display method as the display of the 24-hours operations status graph 22-3 at the above mentioned operations status picture 22 is applied to a "status" display part 23-2 provided below the line graph 23-1. That is, the operations status for 24 hours is classified with color codes by four types, "operation", "normal stop(standby)", "stop due to occurrence of abnormality", and "electric power shut off", as corresponding to time.

A "condition" display part 23-3 is provided below the "status" display part 23-2. At the "condition" display part 23-3, a color is changed when a molding condition, namely the condition of every molding article is changed.

An "item" display part 23-4 is provided below the "condition" display part 23-3. At the "item" display part 23-4, a color is changed when a condition item in the molding condition is changed. For example, the color at the "item" display part 23-4 is changed when a condition of injection or mold-opening is changed.

A graph 23-5 for corresponding to display items is provided below the "item" display part 23-4. The graph 23-5 consists of five kinds of graphs. The five kinds of graphs show time progress of "filling time", "minimum cushion position", "position at the time of finishing keeping pressure", "V-P switching position" and "position prior to filling" shown as selection items 23-6 for displaying graphs in order from upper to lower.

A stick graph 23-7 is provided at the right side of the summary graph picture 23-5. The stick graph 23-7 shows the operations status of the machine in past 24 hours by an operations ratio ranging from 0% through 100%.

FIG. 4 is a view showing a setting history picture 24, which is a third example of the managing picture displayed at the display apparatus of the managing apparatus 20. The setting history picture 24 links with the summary graph picture 23 shown in FIG. 3. The setting history picture 24 is displayed by clicking a designated position, which is an icon at the summary graph picture 23. For every machine (for the first machine in this embodiment), the history of setting change is displayed at one picture with changed items 24-1, setting values 24-2 before being changed, setting values 24-3 after being changed, and date and time 24-4 when changed.

FIG. 5 is a view showing an abnormality history picture 25, which is a fourth example of the managing picture displayed at the display apparatus of the managing apparatus 20. The abnormality history picture 25 is linked with the summary graph picture 23 shown in FIG. 3.

The abnormality history picture 25 is displayed by clicking a designated position, which is an icon at the summary graph picture 23. For every machine (for the first machine in this embodiment), the history of occurrence of abnormality is displayed at one picture with items 25-1 of abnormality, date and time 25-2 of occurrence of abnormality, and date and time 25-3 of lifting of abnormality.

Thus, molding information or the like obtained from the operator via the PDA 30 or respective control apparatuses of the injection molding machines 10-1 and 10-2 can be displayed, checked, and registered at the managing apparatus 20. Furthermore, as described below, it is possible to take operations contents from the managing apparatus 20 so that the operations contents can be displayed and checked at the PDA 30 of the operator.

Next, details of the PDA 30 shown in FIG. 1 are described.

The PDA 30 includes a display that functions as a display part. The PDA 30 functions as a portable information terminal corresponding to the radio LAN. Information is transferred between the PDA 30 and the managing apparatus 20 via the radio machine 21 connected to the managing apparatus 20.

The PDA 30 is carried by at least a single operator who is on a manufacturing floor. As long as it has a display and functions as a portable information terminal corresponding to a radio LAN, a pocket PC (Personal Computer) can be used instead of the PDA 30, for example.

In a case where plural operators exist on the manufacturing floor so that plural portable information terminals 30 exist, if which injection molding machines are handled by the respective operators is determined, information of who handles which injection molding machine is stored in the managing apparatus 20 in advance.

Exclusive software for the manufacturing floor is installed in the PDA 30. The PDA 30 can be used as a setting apparatus of the injection molding machine. In this case, the PDA 30 is connected to the injection molding machine by wire or radio. For example, the injection molding machines 10-1 and 10-2 have receivers (not shown) for receiving information from the PDA 30. WEB technology is used for inputting the information and displaying the instructions on the PDA 30.

Next, flow of information at the molding machine managing system of this embodiment implemented by the above mentioned managing apparatus 20 and the PDA 30 is described with reference to FIG. 6 and FIG. 7.

Figure 6:
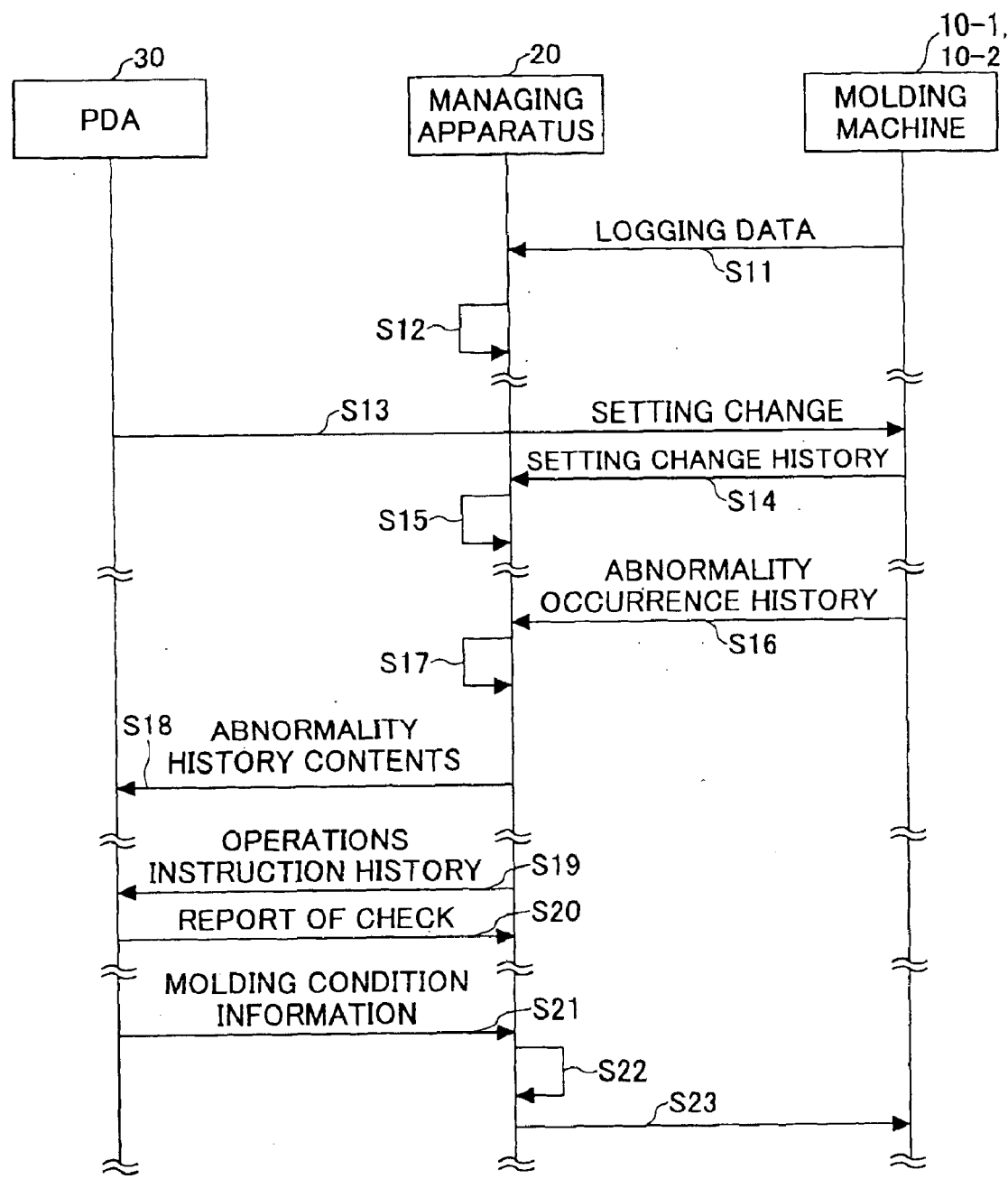
FIG. 6 is a first sequence view showing a flow of information at the molding machine managing system of the embodiment of the present invention.

FIG. 6 is a first sequence view showing a flow of information at the molding machine managing system of the embodiment of the present invention. FIG. 7 is a second sequence view showing a flow of information at the molding machine managing system of the embodiment of the present invention. In this embodiment, information is transferred by executing a program installed in a recording medium installed in the managing apparatus 20 and a program installed in a recording medium installed in the PDA 30.

Referring to FIG. 6, logging data are always transferred from the injection molding machines 10-1 and 10-2 to the managing apparatus 20 (S11) so as to be data-base registered in the managing apparatus 20 (S12). The logging data are information elements with respect to operation or status of the injection molding machines 10-1 and 10-2. The logging data are sent from various kinds of sensors provided at the injection molding machines 10-1 and 10-2 to the managing apparatus 20 via the respective control apparatuses of the injection molding machines 10-1 and 10-2.

The PDA 30 may be connected to the injection molding machines 10-1 and 10-2 by radio or wire without the managing apparatus 20 so that setting conditions of the injection molding machines 10-1 and 10-2 can be changed by the PDA 30 (S13). In this case, the setting conditions stored at the injection molding machines 10-1 and 10-2 are edited. Such change of the setting conditions are transferred from the control apparatus inside of the injection molding machines 10-1 and 10-2 to the managing apparatus 20 as a setting change history (S14), so that this setting change history is registered at the managing apparatus 20 (S15).

Thus, it is possible to implement an operation of setting change against the injection molding machines 10-1 and 10-2 at any place in the manufacturing factory by the PDA 30.

In a case where an abnormal situation in the injection molding machine 10-1 or 10-2 occurs, a history of an operation abnormality (abnormality occurrence history) such as information about the injection molding machine having the abnormal situation, contents of abnormality, time of occurrence of abnormality, or the like is transferred from the injection molding machine 10-1 or 10-2 to the managing machine 20 (S16) so as to be registered at the managing apparatus (S17). That is, since the exclusive managing software is installed in the managing apparatus 20, the obtained information is processed for every injection molding machine by the managing software so as to be stored in the memory installed in the managing apparatus 20. As shown in FIG. 5, the abnormality occurrence history is displayed at the display apparatus of the managing apparatus 20 as a managing picture.

Furthermore, the contents of the abnormality occurrence history are transferred to the PDA 30 corresponding to the machine wherein the abnormal situation occurs via the radio LAN (S18). FIG. 8 is a view showing a picture (stop table picture) 60 of a PDA 30 where an abnormality occurrence history is displayed.

Referring to FIG. 8, at the stop table picture 60, it is possible to display reasons for stopping every time when the injection molding machine stops, by pushing display switch button 61. Items such as a molding condition, status, stooping time due to abnormality, time when abnormal situation occurs, time for restart working, contents of abnormality, peripheral apparatus, supplements of abnormality, reasons for abnormality, or memo are displayed at the stop table picture 60.

Thus, even if the operator having the PDA 30 is at a position far from the injection molding machine having the abnormal state, the operator can check the contents of the abnormality in real time via the stop table picture 60 of the PDA 30. That is, since the manager of the managing apparatus 20 and the operator in the manufacturing factory can both use the information of the abnormality and respond to the abnormality immediately, manufacturing quality and operations ratio can be improved and efficiency of the operation can be achieved.

Meanwhile, not only the above mentioned abnormality occurrence history but also the following operations instruction information can be transferred from the managing apparatus 20 to the PDA 30.

For example, if the manager inputs the operations instruction information about the manufacturing product manufactured by the injection molding machine 10-1 or 10-2, such as which molding article is manufactured from what time to what time by which injection molding machine, what are necessary materials for manufacturing, which mold is necessary for manufacturing, how many shots is estimated, into the managing apparatus 20, the operation instruction information is sent from the managing apparatus 20 to the PDA 30 of the injection molding machine 10-1 or 10-2 (S19).

FIG. 9 is a view showing a picture (operation instruction information picture) 70 of the PDA 30 where operations instruction information is displayed. Referring to FIG. 9, operation instruction information such as the name (operator number) of an operator of the PDA 30, the number of a molding machine operated, a name of a product being manufactured, a molding condition, a mold being used, material being used, an estimated number of manufactured articles, is displayed at the operation instruction information picture 70 of the PDA 30. Therefore, even if the operator is far from the managing apparatus 20 or the injection molding machines 10-1 and 10-2, the information such as the operations instruction can be transferred from the managing apparatus 20 to the operator in real time via the PDA 30. Because of this, the operator can check the operation instruction information displayed at the display so that the operation can implement preparation for next manufacturing and manufacturing in real time.

After checking the operations instruction information, the operator sends a report about the check results by the PDA 30 (S20). As a result of this, it is possible to easily know who checks the operations instruction and who performs the operations, by using the managing apparatus 20.

Instead of the operations instruction information, instruction information about the change of manufacturing plan may be transferred by a similar flow. Therefore, in a case where the manufacturing plan must be changed urgently, even if the operator is not on the manufacturing floor, it is possible to advise the operator of the change of the manufacturing plan. Thus, in this embodiment, the information regarding change of the manufacturing plan can be transferred to the operator with high precision and accuracy so that the operator can correspond immediately and reliably.

Meanwhile, not only the report of check results of the above mentioned operations instruction information but also the molding condition information that is setting information of the molding machine can be transferred from the PDA 30 to the managing apparatus 20.

That is, information about molding conditions and molding plans that the operator on the manufacturing floor knows best, such as information about a mold functioning as a fixed machine of the operations apparatus and used next, information about resin that is a material used for the operations apparatus, a manufacturing article, an estimated shot number, and the date of end of manufacturing, is transferred from the PDA 30 to the managing apparatus 20 (S21). Such molding condition information that is information about molding operations is registered at the managing apparatus 20 (S22) and transferred from the managing apparatus 20 to the corresponding injection molding machine 10-1 or 10-2 (S23).

For example, a bar code as molding information is provided to the mold of the injection molding machines 10-1 and 10-2. Furthermore, a relationship between the bar code of the mold and molding condition is registered at the managing apparatus 20 in advance. Based on input of the information of the bar code of the mold to the PDA 30 by the operator, the mold apparatus 20 is instructed to upload necessary molding conditions (S21). As a result of this, the managing apparatus 20 uploads the necessary molding condition to the injection molding machine 10-1 or 10-2 (S23).

Conventionally, the molding condition information is transferred to the manager by a paper document. However, by using the PDA 30 of the present invention, the operator can easily transfer the molding condition information in real time at any place in the manufacturing factory. In addition, it is possible to reduce paper use at the manufacturing factory.

Meanwhile, according to the conventional art, if the injection molding machine stops working, the information about the reasons why the injection molding machine stops working, such as various problems occurring during manufacturing on the manufacturing floor, for example information about damage of mold during manufacturing, trouble with various pieces of equipment, the quantity of product being manufactured at the time of trouble, cannot be sent to the managing apparatus 20 in real time. That is, according to the conventional art, even if the managing apparatus 20 recognizes the fact of the stopping of the injection molding machine 10-1 or 10-2, the managing apparatus 20 cannot know the reasons for stopping.

However, according to the present invention, the operator inputs the information about reasons for stopping to the PDA 30 so that the information is transferred to the managing apparatus 20 in real time.

Next, input of the information about reasons for stopping by the PDA 30 and transferring of the information is described with reference to FIG. 7, FIG. 10 and FIG. 11. Here, FIG. 10 is a view showing a machine selection picture 80 of the PDA 30. FIG. 11 is a view showing a stop reason editing picture 85 of the PDA 30.

After the operator inputs own ID to a designated login picture so that a login process is implemented, the picture is switched to the machine selection picture 80 shown in FIG. 10.

The name of the operator is displayed in the machine selection picture 80. The operator can select the machine that is the subject of the process by a machine selection item 81. The selection is fixed by pushing a selection button 82. Once the subject of the selection is fixed, the stop table picture 60 shown in FIG. 8 of the injection molding machine which is selected is displayed.

As described above, the items such as the molding condition, the status, stopping time due to abnormality, time when abnormal situation occurs, time for restart working, contents of abnormality, the peripheral apparatus, the reasons for the abnormality, or the memo are displayed at the stop table picture 60 shown in FIG. 8.

By pushing an editing button 62 of the stop table picture 60, the stop table picture 60 switches to the editing picture 85 shown in FIG. 11. At the editing picture 85, not only the items shown in FIG. 11 but also the quantity or situation of the product being manufactured may be set to be input.

Figure 7:
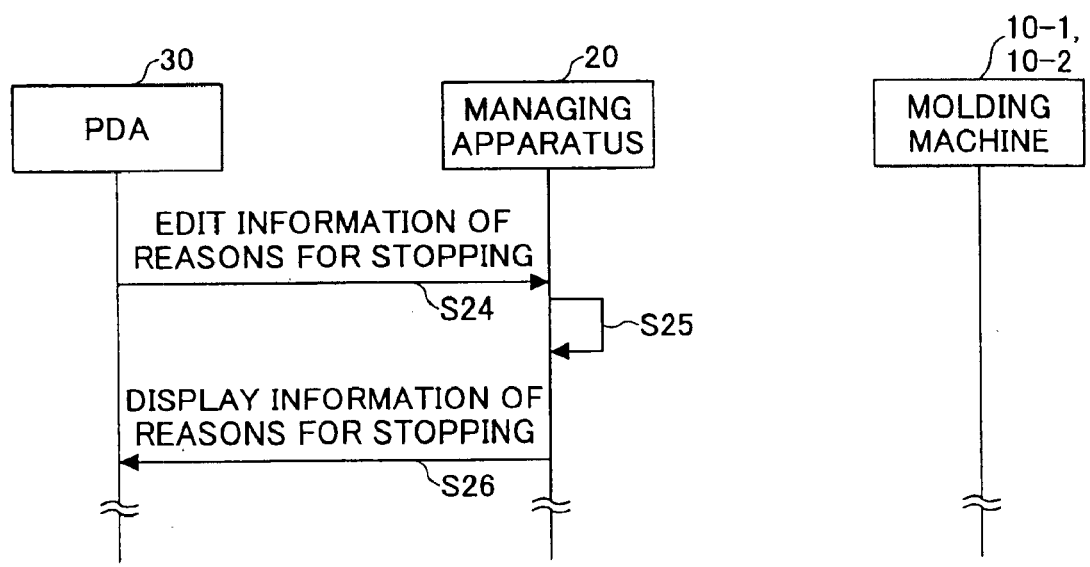
FIG. 7 is a second sequence view showing a flow of information at the molding machine managing system of the embodiment of the present invention.

Based on that, the operator edits supplements of abnormality, the peripheral apparatus, the reasons for abnormality, and memo on editing picture 85 and pushes a registration button 68, as shown in FIG. 7, and the information indicating the reason for stopping is sent to the managing apparatus (S24) and all of the information is registered at the managing apparatus (S25).

Because of this, the status on the manufacturing floor such as the information indicating the reasons for stopping is input and recorded in real time so as to be used for reporting in a daily report, weekly report or monthly report. This information is sent to the managing apparatus 20 separately with the information from the injection molding machine 10-1 or 10-2.

As a response to sending the information indicating the reason for stopping to the managing apparatus 20, an editing result display picture is sent to the PDA 30 (S26) so as to be displayed at the PDA 30 as the stop table picture 60. The operator checks the stop table picture 60 so as to recognize the fact that all of the contents edited by himself/herself are registered at the managing apparatus 20.

Thus, the information about reasons for stopping that cannot be known by using only the managing apparatus 20 can be transferred to the manager of the managing apparatus in real time so that the information can be shared commonly with the operator on the manufacturing floor. Hence, even if a situation where the manufacturing plan must be changed urgently occurs on the manufacturing floor, it is possible for the operator to report the status to the managing apparatus 20 via the PDA 30. Furthermore, since the operator can know the information about the reasons for stopping already stored in the managing apparatus 20, it is possible to immediately respond. As a result of this, high productivity and high working ratio of the equipment can be obtained as well as high efficiency of operations.

The operator can edit, register, and display the reasons for stopping not only for the injection molding machines 10-1 and 10-2 themselves but also for a peripheral apparatus of the injection molding machines 10-1 and 10-2 such as a mold apparatus, an output machine, a mold temperature adjustor machine, a resin drying machine, a conveyor, a stocker, a falling part checking apparatus, and other equipment on the manufacturing floor, via the PDA 30. Therefore, it is possible to manage the reasons for stopping of the above mentioned peripheral apparatuses together in real time. Because of this, it is possible to recognize a trend of the reasons for stopping on the manufacturing floor. Hence, even if similar trouble occurs at an injection molding machine or a peripheral apparatus on another manufacturing floor and under an operator so that the injection molding machine and the peripheral apparatus stop, the operator not having knowledge of the information of the reasons for stopping can know the information of the reasons for stopping already stored at the managing apparatus 20 via the PDA 30 so as to immediately respond.

Furthermore, by knowing the tend of the reasons for stopping, it is possible to make a long-term plan for a maintenance such as "which part should be checked mainly" at "which periods". As a result of this, high productivity and high working ratio of the equipment can be obtained as well as high efficiency of operations.

Furthermore, for example, even if a problem occurs such as shut off the electricity power on the manufacturing floor so that a connection between the injection molding machine 10-1 or 10-2 and the managing apparatus 20 is cut off, the PDA 30 functioning as the portable information terminal can be connected to the managing apparatus 20. Therefore, it is possible to recognize reasons of abnormality immediately and restart working the injection molding machine immediately. Hence, it is possible to avoid a loss of productivity due to the problem.

The present invention is not limited to these embodiments, but variations and modifications may be made without departing from the scope of the present invention. For example, other types of molding machines such as an extrusion molding machine can be included as the operations apparatus in the present invention.

This patent application is based on Japanese Priority Patent Application No. 2002-247511 filed on Aug. 27, 2002, the entire contents of which are hereby incorporated by reference.

What is claimed is:

1. A molding machine managing system, comprising:
   a portable information terminal having a display part where received information is displayed; and
   a managing apparatus for managing a molding machine,
   wherein the managing apparatus includes a radio machine,
   information is exchanged between the portable information terminal and the managing apparatus by the radio machine,
   information input to the portable information terminal is sent to the managing apparatus via the radio machine so as to be registered at the managing apparatus, and
   the fact that the information is registered at the managing apparatus is displayed at the portable information terminal as a response to sending the information to the managing apparatus.

2. The molding machine managing system as claimed in claim 1,
   wherein information about a history of an operation abnormality of the molding machine is transferred from the molding machine to the managing apparatus and subsequently transferred to the portable information terminal via the radio machine, so as to be displayed at the display part of the portable information terminal.

3. The molding machine managing system as claimed in claim 1,
   wherein information about an instruction or a change of an operation of the molding machine is transferred from the managing apparatus to the portable information terminal via the radio machine, so as to be displayed at the display part of the portable information terminal.

4. The molding machine managing system as claimed in claim 1,
   wherein based on input of information of molding operations of the molding machine to the portable information terminal, the information is transferred to the managing apparatus via the radio machine and subsequently transferred to the molding machine.

5. The molding machine managing system as claimed in claim 4,
   wherein the information of molding operations is information with respect to a mold provided at the molding machine,
   a relation between the mold and a molding condition is registered, and
   based on input of the information with respect to the mold to the portable information terminal, the information is transferred to the managing apparatus via the radio machine, so that the managing apparatus uploads a molding condition necessary for the molding machine.

6. A molding machine managing system, comprising:
   a portable information terminal having a display part where received information is displayed; and
   a managing apparatus for managing a molding machine,
   wherein the managing apparatus includes a radio machine, information is exchanged between the portable information terminal and the managing apparatus by the radio machine, and
   based on input to the portable information terminal of information with respect to reasons for stopping of the molding machine that cannot be determined by the managing apparatus, the information is transferred to the managing apparatus via the radio machine so as to be registered at the managing apparatus.

7. The molding machine managing system as claimed in claim 1,
   wherein the molding machine is connected to the portable information terminal by one of radio and wire, and
   a setting condition of the molding machine is changed by the portable information terminal.

8. A molding machine managing apparatus for managing a molding machine, comprising a radio machine,
   wherein the molding machine managing apparatus exchanges information with a portable information terminal by the radio machine,
   information input to the portable information terminal is sent to the molding machine managing apparatus via the radio machine so as to be registered at the molding machine managing apparatus, and
   the fact that the information is registered at the molding machine managing apparatus is displayed at the portable information terminal as a response to sending the information to the molding machine managing apparatus.

9. The molding machine managing apparatus for managing a molding machine as claimed in claim 8,
   wherein the molding machine managing apparatus receives information about a history of an operation abnormality of the molding machine from the molding machine, and subsequently sends the information to the portable information terminal.

10. The molding machine managing apparatus for managing a molding machine as claimed in claim 8,
    wherein the molding machine managing apparatus transfers information about an instruction of a change of an operation of the molding machine to the portable information terminal.

11. The molding machine managing apparatus for managing a molding machine as claimed in claim 8,
wherein the molding machine managing apparatus receives information of molding operations of the molding machine from the portable information terminal, and subsequently transfers the information to the molding machine.

12. The molding machine managing apparatus for managing a molding machine as claimed in claim 11,
wherein a relation between a mold provided at the molding machine and a molding condition is registered, and
the molding machine managing apparatus receives information with respect to the mold, and subsequently uploads a molding condition necessary for the molding machine.

13. A molding machine managing apparatus for managing a molding machine, comprising a radio machine,
wherein the molding machine managing apparatus exchanges information with a portable information terminal by the radio machine, and
wherein the molding machine managing apparatus receives from the portable information terminal information with respect to reasons for stopping of the molding machine that cannot be determined by the managing apparatus so that the information is registered at the molding machine managing apparatus.

14. A portable information terminal, comprising a display part where received information is displayed,
wherein the portable information terminal exchanges information with a molding machine managing apparatus for managing a molding machine,
information input to the portable information terminal is sent to and registered at the managing apparatus, and
the fact that the information is registered at the managing apparatus is displayed at the portable information terminal as a response to sending the information to the managing apparatus.

15. The portable information terminal as claimed in claim 14,
wherein the portable information terminal receives information about a history of an operation abnormality of the molding machine from the molding machine managing apparatus so that the information is displayed at the display part.

16. The portable information terminal as claimed in claim 14,
wherein the portable information terminal receives information about an instruction or a change of an operation of the molding machine from the molding machine managing apparatus so that the information is displayed at the display part.

17. The portable information terminal as claimed in claim 14,
wherein based on input of information of molding operations of the molding machine to the portable information terminal, the information is transferred to the molding machine via the molding machine managing apparatus.

18. A portable information terminal, comprising a display part where received information is displayed,
wherein the portable information terminal exchanges information with a molding machine managing apparatus for managing a molding machine, and
wherein based on input of information to the portable information terminal with respect to reasons for stopping of the molding machine that cannot be determined by the managing apparatus, the information is transferred, to and registered at the molding machine managing apparatus.

19. A recording medium where a program is installed, the program for causing a molding machine managing apparatus for managing a molding machine to perform steps, the managing apparatus having a radio machine, the steps comprising:
receiving information about a history of an operation abnormality of the molding machine from the molding machine;
transferring the information about the history of the operation abnormality of the molding machine to a portable information terminal;
receiving information from the portable information terminal at the managing apparatus, the information from the portable information terminal to be registered at the managing apparatus; and
sending a response, displayed at the portable information terminal, from the managing apparatus acknowledging the fact that the information from the portable information terminal has been registered at the managing apparatus.

20. The recording medium where the program is installed as claimed in claim 19, the program further comprising the step of:
transferring information about an instruction or a change of an operation of the molding machine to the portable information terminal.

21. The recording medium where the program is installed as claimed in claim 19, the program further comprising the steps of:
receiving information of molding operations of the molding machine from the portable information terminal; and
transferring the information of molding operations of the molding machine to the molding machine.

22. The recording medium where the program is installed as claimed in claim 21,
wherein a relation between the mold and a molding condition is registered at the program,
the program further comprises the step of:
based on receiving the information with respect to the mold from the portable information terminal, uploading a molding condition necessary for the molding machine.

23. A recording medium where a program is installed, the program for causing a molding machine managing apparatus for managing a molding machine to perform steps, the managing apparatus having a radio machine, the steps comprising:
receiving information about a history of an operation abnormality of the molding machine from the molding machine;
transferring the information to a portable information terminal;
receiving information with respect to reasons for stopping of the molding machine that cannot be determined by the managing apparatus from the portable information terminal; and
registering the information.

24. A recording medium where a program is installed, the program for causing a portable information terminal having a display part where received information is displayed to perform steps, the portable information terminal being used for exchanging information with a managing apparatus for managing the molding machine, the steps comprising:

receiving information about a history of an operation abnormality of the molding machine from the molding machine;

displaying the information at the display part;

inputting another information into the portable information terminal:

sending the information input into the portable information terminal to the managing apparatus; and receiving a response, displayed at the display part, from the managing apparatus acknowledging the fact that the information input into the portable information terminal has been registered at the managing apparatus.

25. The recording medium where the program is installed as claimed in claim 24, the program further comprising the step of:

receiving information about an instruction or a change of an operation of the molding machine from the managing apparatus; and displaying the information at the display part.

26. A recording medium where a program is installed, the program for causing a portable information terminal having a display part where received information is displayed to perform steps, the portable information terminal being used for exchanging information with a managing apparatus for managing the molding machine, the steps comprising:

receiving information about a history of an operation abnormality of the molding machine from the molding machine;

displaying the information at the display part;

based on input of information with respect to reasons for stopping of the molding machine that cannot be determined by the managing apparatus, sending the information to the managing apparatus.

27. The recording medium where the program is installed as claimed in claim 24, the program further comprising the step of:

changing a setting condition of the molding machine, which is connected to the portable information terminal by radio or wire.

\* \* \* \* \*